(12) United States Patent
Schmall

(10) Patent No.: US 10,087,086 B1
(45) Date of Patent: Oct. 2, 2018

(54) METHODS AND RISER PIPE FOR DEWATERING OF FLY ASH POND OR PIT

(71) Applicant: MORETRENCH AMERICAN CORPORATION, Rockaway, NJ (US)

(72) Inventor: Paul Schmall, Basking Ridge, NJ (US)

(73) Assignee: Moretrench American Corporation, Rockaway, NJ (US)

( * ) Notice: Subject to any disclaimer, the term of this patent is extended or adjusted under 35 U.S.C. 154(b) by 94 days.

(21) Appl. No.: 15/285,813

(22) Filed: Oct. 5, 2016

Related U.S. Application Data

(60) Provisional application No. 62/237,988, filed on Oct. 6, 2015.

(51) Int. Cl.
| | | |
|---|---|---|
| *E02B 11/00* | (2006.01) | |
| *B01D 29/15* | (2006.01) | |
| *E21B 43/08* | (2006.01) | |
| *C02F 1/00* | (2006.01) | |
| *B01D 29/23* | (2006.01) | |
| *E03F 5/10* | (2006.01) | |
| *C02F 103/18* | (2006.01) | |

(52) U.S. Cl.
CPC .............. *C02F 1/004* (2013.01); *B01D 29/15* (2013.01); *B01D 29/23* (2013.01); *E02B 11/005* (2013.01); *E03F 5/103* (2013.01); *E21B 43/084* (2013.01); *E21B 43/086* (2013.01); *C02F 2103/18* (2013.01); *C02F 2307/00* (2013.01)

(58) Field of Classification Search
CPC . B01D 29/13; B01D 29/15; E03F 5/10; E03F 5/103; E02B 11/00; E02B 11/005; E21B 43/084; E21B 43/086; E21B 43/38; C02F 2103/18

USPC .. 210/170.01, 170.07, 416.1, 459, 460, 488, 210/747.1, 747.7, 747.9; 166/230, 265; 405/43, 45

See application file for complete search history.

(56) References Cited

U.S. PATENT DOCUMENTS

| | | | | |
|---|---|---|---|---|
| 4,363,735 A | * | 12/1982 | Hook | ...................... E02B 15/00 210/747.9 |
| 5,314,018 A | * | 5/1994 | Cobb | ...................... E21B 43/38 166/265 |
| 6,352,111 B1 | * | 3/2002 | Bode | ...................... B01D 29/15 166/265 |

(Continued)

OTHER PUBLICATIONS

Kirsten Peterson Stroud, The Deal on Dewatering, http://www.wqpmag.com/sites/wqpmag.com/files/10_tu_thompson_0412WQP_0.pdf.

(Continued)

*Primary Examiner* — Christopher Upton
(74) *Attorney, Agent, or Firm* — Budzyn IP Law, LLC

(57) ABSTRACT

A method is provided herein of dewatering a fly ash pond or pit, the method including: preparing one or more wellbores in, or in proximity to, the fly ash pond or pit; installing a riser pipe into a first of the wellbores, the riser pipe including a drain pipe having perforations formed therethrough, and a filter textile wrapped about the drain pipe so as to at least overlap the perforations, the filter textile being porous with openings having apparent opening size of 200 microns or less; and, generating negative pressure within the riser pipe so as to draw water from adjacent the first wellbore and through the filter textile. Advantageously, the method of the subject invention allows for the dewatering of a fly ash pond or pit with extraction of water therefrom which is visibly clear.

9 Claims, 3 Drawing Sheets

(56) References Cited

U.S. PATENT DOCUMENTS

| | | | |
|---|---|---|---|
| 6,390,192 B2 | 5/2002 | Doesburg et al. | |
| 7,588,079 B2 * | 9/2009 | Kluger | E21B 43/084 166/228 |
| 7,909,535 B2 | 3/2011 | Samara | |
| 2004/0026313 A1 * | 2/2004 | Fischer | E21B 43/084 210/489 |
| 2007/0256834 A1 * | 11/2007 | Hopkins | E21B 43/082 166/230 |
| 2008/0217002 A1 * | 9/2008 | Simonds | E21B 43/084 166/230 |
| 2008/0283239 A1 * | 11/2008 | Langlais | E21B 43/084 166/230 |
| 2010/0163481 A1 * | 7/2010 | McGrenera | E21B 43/084 210/488 |
| 2010/0319914 A1 * | 12/2010 | Dowsett | E21B 43/084 166/230 |

OTHER PUBLICATIONS

Groundwater Engineering PTE Ltd., Blog | Wellpoint Dewatering, Dec. 11, 2014, pp. 1-7, http://www.groundwatereng.com/blog/2014/12/wellpoint-dewatering.

* cited by examiner

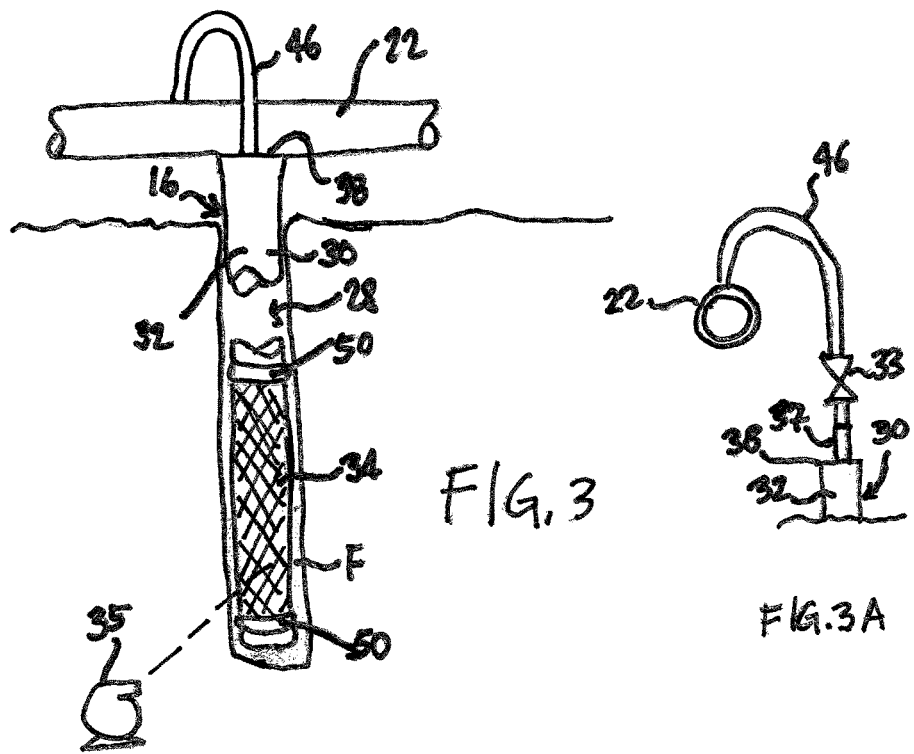
FIG. 3
FIG. 3A
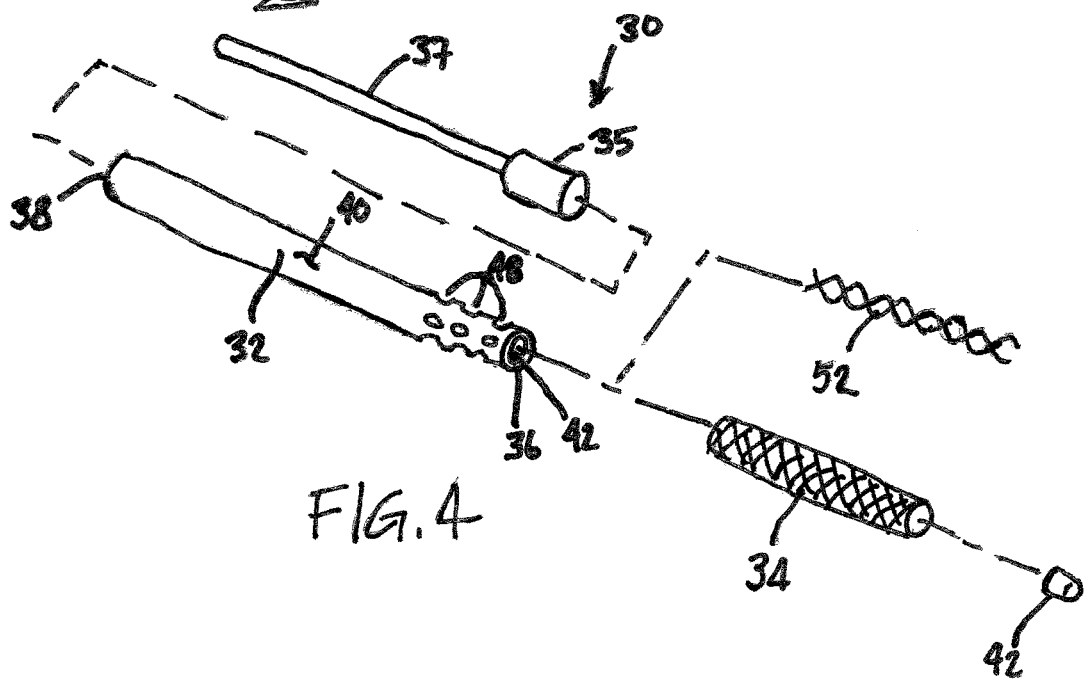
FIG. 4

METHODS AND RISER PIPE FOR DEWATERING OF FLY ASH POND OR PIT

BACKGROUND OF THE INVENTION

Fly ash is a by-product of burning coal. Coal-burning electricity generating facilities produce significant amounts of fly ash as a result of normal operation. To clear out fly ash from such a plant, a stream of water is typically introduced to collect the fly ash in suspension in forming a flowing slurry which is deposited in a nearby contained area. The water may be decanted or otherwise separated from the slurry and recirculated to remove further fly ash. Over time, a fly ash pond or pit may be formed containing significant amounts of fly ash.

Recent federal regulations require the closure or remediation of coal ash ponds or impoundments. The regulations allow for various closure or remediation options such as capping, consolidating into a new landfill, disposing off-site, converting to wetlands, or any combination of these options. Difficulties are presented in handling and working on fly ash across large surface areas, particularly due to its instability. Dewatering and/or stabilization of the fly ash is often necessary. This instability results not only from the fineness of the fly ash, but also the presence of water and the fly ash being found in large quantities. Dewatering a fly ash pond or pit increases the stability of the fly ash to allow for better handling thereof.

SUMMARY OF THE INVENTION

A method is provided herein of dewatering a fly ash pond or pit, the method including: preparing one or more wellbores in, or in proximity to, the fly ash pond or pit; installing a riser pipe into a first of the wellbores, the riser pipe including a drain pipe having perforations formed therethrough, and a filter textile wrapped about the drain pipe so as to at least overlap the perforations, the filter textile being porous with openings having apparent opening size of 200 microns or less; and, generating negative pressure within the riser pipe so as to draw water from adjacent the first wellbore and through the filter textile. Advantageously, the method of the subject invention allows for the dewatering of a fly ash pond or pit with extraction of water therefrom which is visibly clear.

In a further aspect of the subject invention, a riser pipe is provided which is useable in dewatering a fly ash pond or pit, the riser pipe including a drain pipe having perforations formed therethrough, and a filter textile wrapped about the drain pipe so as to at least overlap the perforations, the filter textile being porous with openings having apparent opening size of 200 microns or less.

These and other features of the invention will be better understood through a study of the following detailed description and accompanying drawings.

BRIEF DESCRIPTION OF THE DRAWINGS

FIGS. 3 and 3A are schematics of arrangements useable with the subject invention;
FIG. 4 is an exploded view of a riser pipe useable with the subject invention.

DETAILED DESCRIPTION OF THE INVENTION

Figure 1:
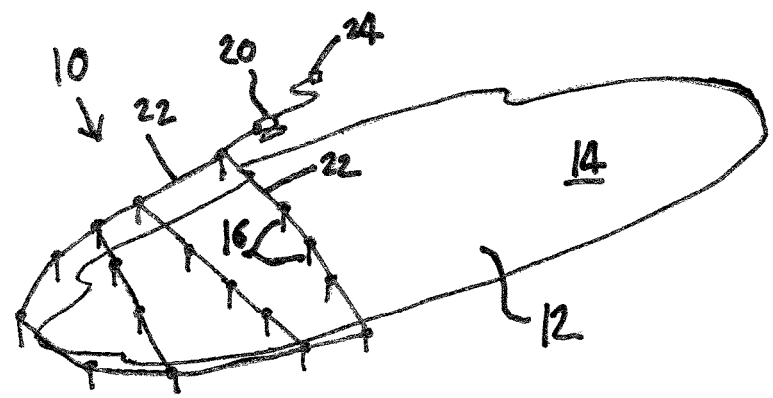
FIGS. 1 and 2 show schematically an arrangement for dewatering of a fly ash pond or pit.
Figure 2:
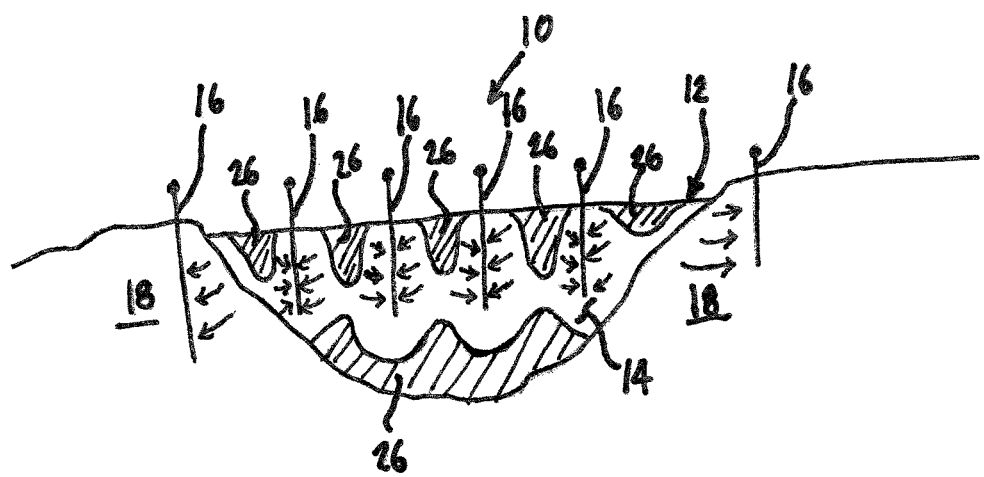

FIGS. 1 and 2 each show a system 10 useable for dewatering of a fly ash pond or pit 12, such as that formed by fly ash disposal for a coal-burning electricity generating facility. The pond or pit 12, as shown in FIG. 2, is a contained area in which fly ash 14 is collected. As will be understood by those skilled in the art, the amount of water present within the containment area may dictate whether the containment area is perceived as a pond or a pit. In either regard, references made herein to a "pond" or "pit" is to a containment area for fly ash. The pond or pit 12 may be defined by a depression in the ground and/or a containment structure, such as a levee or other raised barrier.

In addition, it is noted that references herein to "fly ash" is intended to cover any form of coal ash resulting as a by-product of coal burning.

As shown in FIGS. 1 and 2, the system 10 includes a plurality of wells 16 distributed in an array across and/or adjacent to the pond or pit 12. Each of the wells 16 is embedded into the fly ash 14 or into adjacent soil 18 to a particular depth. The wells 16 may be activated, in the same manner as wellpoints, by applying negative pressure thereto, such as by one or more surface pumps 20, resulting in water being drawn from the pond or pit 12 thereby causing dewatering thereof. The wells 16 may be also activated by submerged (i.e., subsurface) pumps, as disclosed below. The use of surface pumps or submerged pumps may be dictated by site conditions and/or depth of the associated well 16.

As shown in FIG. 1, one or more of the wells 16 may be joined to one or more common headers 22, which are in turn connected to the one or more surface pumps 20 which may be utilized to generate negative pressure. In this manner, water collected from a plurality of the wells 16 may be directed to one or more common drains 24 for more practical handling thereof. Also, where submerged pumps are utilized within the wells 16 to force water therefrom, e.g., for a deep well, the one or more common headers 22 may be utilized as a drainage system, again with the one or more common drains 24.

As will be appreciated by those skilled in the art, the quantity, spacing and location of the wells 16 affects the completeness of the dewatering. By way of illustration, hatched areas 26 in FIG. 2 represent areas in the fly ash 14 containing higher water content. As will be appreciated by those skilled in the art, areas adjacent to the wells 16 will be first dewatered with more remote areas being subsequently dewatered. The wells 16 are typically arranged to achieve the highest level of dewatering without the need for an excessive quantity of the wells 16.

As shown in FIG. 3, each of the wells 16 includes a wellbore 28 with a riser pipe 30 being disposed therein. The wellbore 28 may be formed in the fly ash 14 or the soil 18 using any excavation technique, such as jetting. The wellbore 28 should be prepared to a depth sufficient to allow for proper dewatering of that area. In addition, the diameter of the wellbore 28 should be prepared relative to the diameter of the riser pipe 30 along with any further considerations, such as whether filter sand will be utilized in the well 16.

As shown in FIG. 4, the riser pipe 30 includes a drain pipe 32 and a filter textile 34. The drain pipe 32 may be of any length or diameter required to satisfy the drainage needs of the associated well 16. The drain pipe 32 may be of various materials, including PVC or other polymeric material.

The drain pipe 32 includes a bottom end 36 and a top end 38 with a wall 40 extending therebetween. An inner lumen 42, which defines an open passageway, e.g., for flow of water, extends between the bottom end 36 and the top end 38 inside the wall 40. It is preferred that the bottom end 36 be closed, which can be done by causing obstruction thereof or by providing a separate closure member, such as cap 44. The top end 38 is intended to be left open so as to allow for flow of water therefrom removed from the well 16. As shown in FIG. 3, the top end 38 may be coupled to the common header 22 by connection 46, which may be a hose connection. The connection 46 may be at least partially visually transmissive so as to allow for visual inspection of removed water while flowing through the connection 46. Optionally, valving 33 may be provided with the connection 46 to regulate flow of the drained water.

The drain pipe 32 is formed with a plurality of perforations 48 which allow for flow through the wall 40 and into the inner lumen 42. Any configuration of the perforations 48 may be utilized (e.g., slits, holes, etc.). It is preferred that the perforations 48 be generally located closer to the bottom end 36 than the top end 38 of the drain pipe 32.

Figure 5:
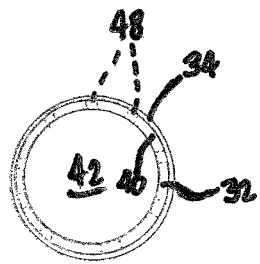
FIGS. 5 and 6 are, respectively, cross-sectional views of riser pipes useable with the subject invention; and,
FIG. 7 is a partial longitudinal view of a riser pipe useable with the subject invention shown with different sections in cut-away.

As shown in FIG. 5, the filter textile 34 is provided to be wrapped about the drain pipe 32 particularly about the exterior of the wall 40. The filter textile 34 is provided with sufficient length so as to at least overlap the perforations 48. Preferably, the filter textile 34 is stitched or otherwise joined to take a cylindrical shape, as shown in FIG. 4, so as to be telescoped about the exterior of the drain pipe 32. Alternatively, the filter textile 34 may be wrapped about the drain pipe 32.

The filter textile 34 is secured to the drain pipe 32 with one or more seals 50, as shown in FIG. 3. The seals 50 may be elastomeric and/or thermoplastic materials which apply a binding force to the filter textile 34 about the drain pipe 32. The seals 50 may be secured by adhesive, inherent bias and/or shrink fit.

In use with negative pressure being applied to the riser pipe 30, water is caused to be drawn from adjacent portions of the wellbore 28 through the filter textile 34 and through the drain pipe 32, by traversing through the perforations 48 and the inner lumen 42. The negative pressure may be generated by the one or more surface pumps 20 which are in communication with the riser pipe 30, either directly or through one or more of the common headers 22. In addition, or, alternatively, as shown in broken lines in FIG. 3, one or more submerged pumps 35 may be located within the riser pipe 30, submerged within the wellbore 28, configured to draw water accumulated within the wellbore 28 through the filter textile 34 and through the perforations 48. Preferably, the submerged pump 35 has an intake located within the expanse of the perforations 48 and overlapped by the filter textile 34. The submerged pump 35 may discharge into the inner lumen 42. Preferably, a discharge pipe 37 is mounted to the discharge of the submerged pump 35. As shown in FIG. 3A, the discharge pipe 37 may extend through the inner lumen 42, possibly past the top end 38, to the connection 46 to discharge drained water thereinto. The submerged pump 35 may be mounted to the discharge pipe 37 (FIG. 4) so that the submerged pump 35 may be lowered into the riser pipe 30 with the discharge pipe 37 once the riser pipe 30 is installed. Any electrical wiring or other electrical requirements may be run up inside the riser pipe 30, for example, sealed within the inner lumen 42, to the surface.

The filter textile 34 acts to restrict the fly ash 14 from entering into the drain pipe 32 during the dewatering process. The filter textile 34 may be formed of any material, woven or non-woven, which is porous with openings having apparent opening size (AOS) of 200 microns or less. By way of non-limiting example, the filter textile 34 may be formed of nylon monofilament and may be woven. Apparent opening sizes may be determined by various standards including ASTM D4751. More preferably, the openings have apparent opening size in the range of 55 microns-200 microns. Most preferably, the openings have an apparent opening size of 75 microns. Testing has found that the use of the filter textile 34 as described herein results in visually clear water being extracted from a fly ash location. It is noted that fly ash may be present in extracted water, particularly upon initial pumping. This is considered a minimal amount, since visually clear water is extractable.

With reference to FIG. 3, optionally, filter sand F may be introduced into the well 16, particularly into the wellbore 28 about the filter textile 34. It is noted that the filter sand F may be imperfect, in consideration of the instability of the fly ash 14 surrounding the wellbore 28. As such, the introduction of the filter sand F may disrupt the fly ash 14 surrounding the wellbore 28, thus causing the filter sand F to have fly ash mixed therein. The filter sand F is not required for the subject invention.

Figure 6:
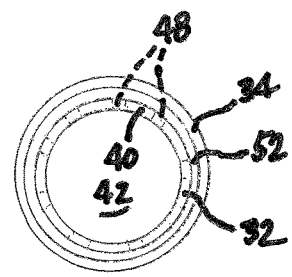
Figure 7:
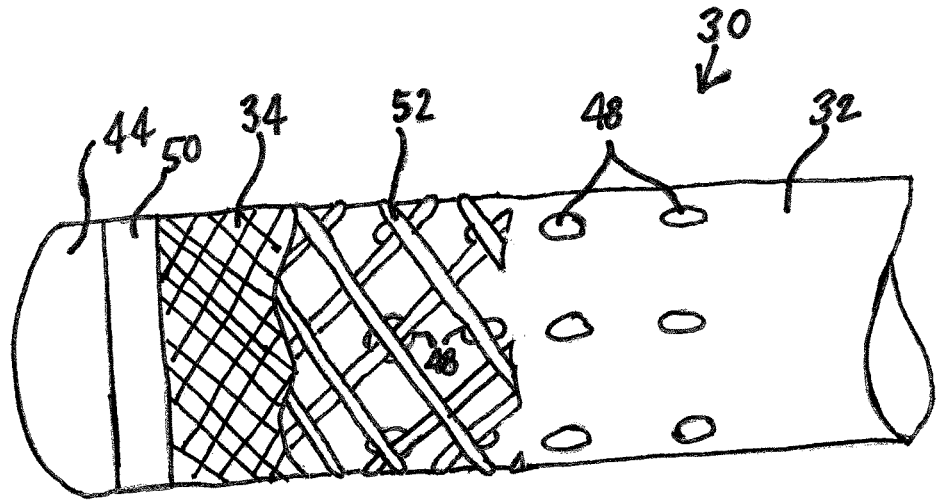

In addition, optionally, a spacer layer 52 may be utilized with the riser pipe 30. As shown in FIGS. 4, 6 and 7, the spacer layer 52 may be located between the filter textile 34 and the drain pipe 32. The retention of the filter textile 34 on the drain pipe 32 described above will also act to retain the spacer layer 52 in place. The spacer layer 52 as shown in FIGS. 4, 6 and 7 may be any lattice or mesh which has relatively large openings. With the use of the spacer layer 52, the filter textile 34 may be provided with a length beyond the perforations 48. Any water passing through the filter textile 34 which is not overlapping the perforations 48 may run along the length of the drain pipe 32, inside the filter textile 34, within the openings of the spacer layer 52 to the perforations 48. Without the spacer layer 52, limited water may pass between the filter textile 34 and the drain pipe 32 to the perforations 48. The spacer layer 52 may allow for easier flow of water.

What is claimed is:

1. A method of dewatering a fly ash pond or pit, the method comprising: preparing one or more wellbores in, or in proximity to, the fly ash pond or pit; installing a riser pipe into a first of the wellbores, the riser pipe including a drain pipe having perforations formed therethrough, and a filter textile disposed about the drain pipe so as to at least overlap the perforations, the filter textile being porous with openings having apparent opening size of 200 microns or less; and, generating negative pressure within the riser pipe so as to draw water from adjacent the first wellbore and through the filter textile.

2. A method as in claim 1, wherein the negative pressure is generated by one or more pumps.

3. A method as in claim 1, wherein the negative pressure is generated by one or more submerged pumps.

4. A method as in claim 1, wherein the openings of the filter textile have apparent opening size in the range of 55 microns-200 microns.

5. A method as in claim 4, wherein the openings of the filter textile have apparent opening size of 75 microns.

6. A method as in claim 1, wherein the riser pipe further including a spacer layer between the filter textile and the drain pipe.

7. A method as in claim 6, wherein the spacer layer is a lattice or mesh construct having openings formed therethrough.

8. A method as in claim 6, wherein the riser pipe further including one or more seals which apply a binding force to the filter textile about the drain pipe.

9. A method as in claim 1, wherein the riser pipe further including one or more seals which apply a binding force to the filter textile about the drain pipe.

\* \* \* \* \*